(12) United States Patent
Wada

(10) Patent No.: US 6,753,984 B1
(45) Date of Patent: Jun. 22, 2004

(54) IMAGE READING APPARATUS

(75) Inventor: Hiroyuki Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,396

(22) Filed: Feb. 22, 2000

(30) Foreign Application Priority Data

Feb. 26, 1999 (JP) .......................................... 11-050211

(51) Int. Cl.[7] .............................. H04N 1/04; H04N 1/46; G03F 3/08; G06K 9/00; G06K 9/40; H01L 27/00

(52) U.S. Cl. ....................... 358/475; 358/487; 358/509; 358/512; 358/533; 358/519; 382/112; 382/274; 382/275; 250/208.1

(58) Field of Search ................................. 358/487, 475, 358/509, 512, 533, 519; 382/112, 274, 275; 250/208.1

(56) References Cited

U.S. PATENT DOCUMENTS 5,969,372 A * 10/1999 Stavely et al. .......... 250/559.42
6,437,358 B1 * 8/2002 Potucek et al. ......... 250/559.45
6,498,867 B1 * 12/2002 Potucek et al. ............. 382/274

FOREIGN PATENT DOCUMENTS

JP          05-260256          10/1993

* cited by examiner

Primary Examiner—Edward Coles
Assistant Examiner—Houshang Safaipour
(74) Attorney, Agent, or Firm—Robin, Blecker & Daley

(57) ABSTRACT

An image reading apparatus is arranged to illuminate a transparent or transmissive original with light fluxes emitted by a plurality of light emission parts which differ in wavelength characteristic from each other, to select by means of a reflection mirror the wavelength characteristics of light fluxes emitted from the light emission parts, and to control each of the light emission parts every time a scanning motion is made by an original-placing board relative to an image pickup part.

8 Claims, 12 Drawing Sheets

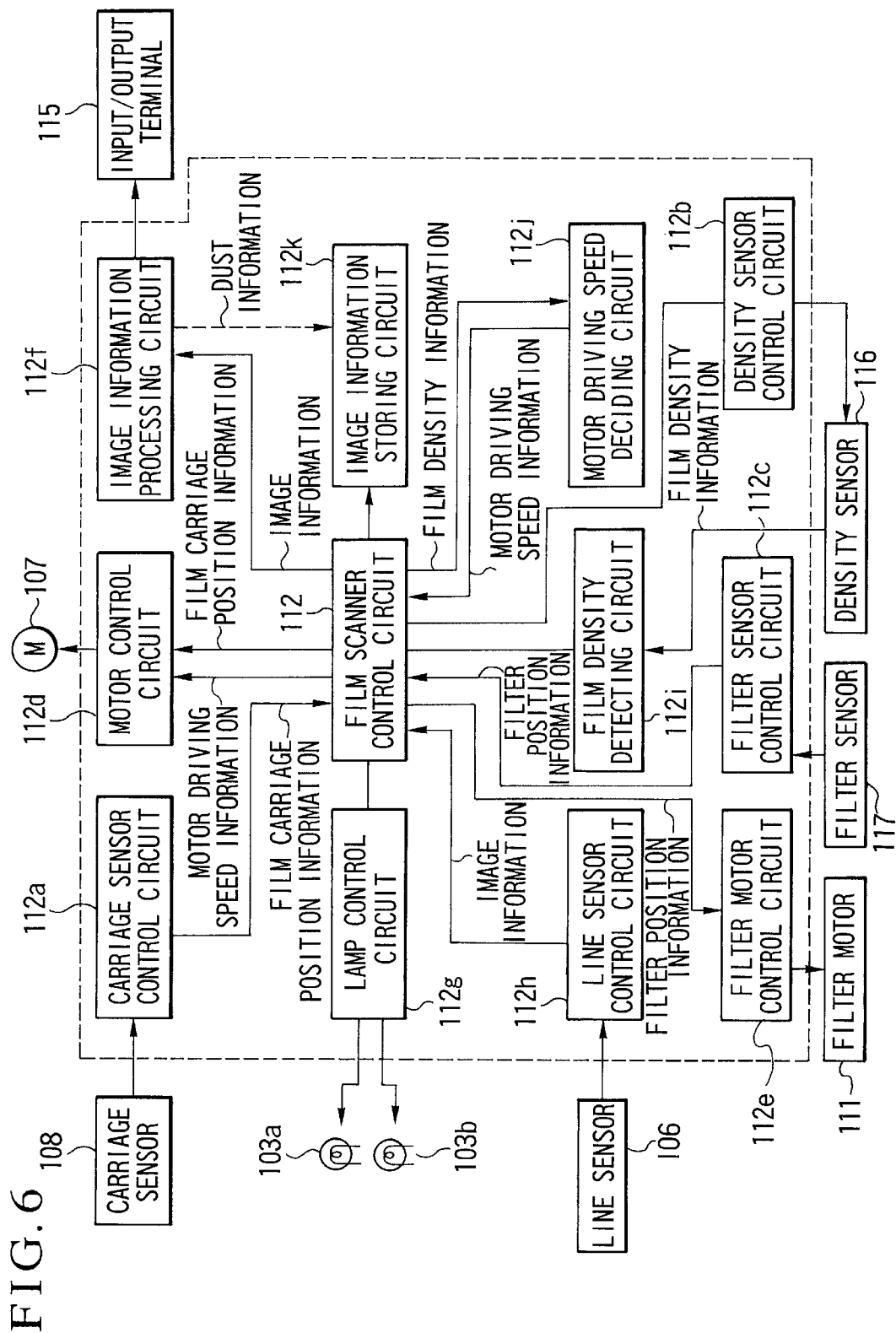

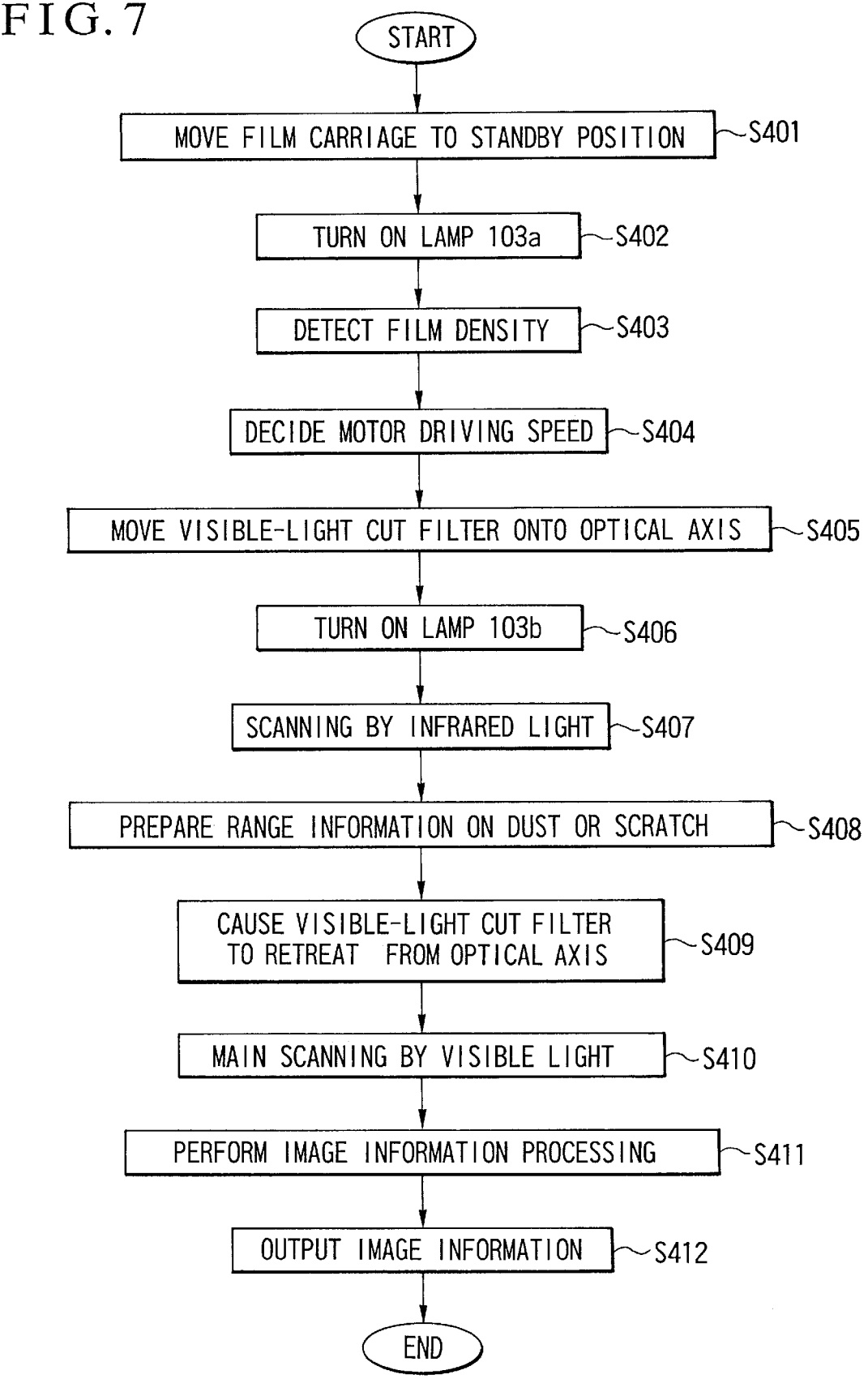

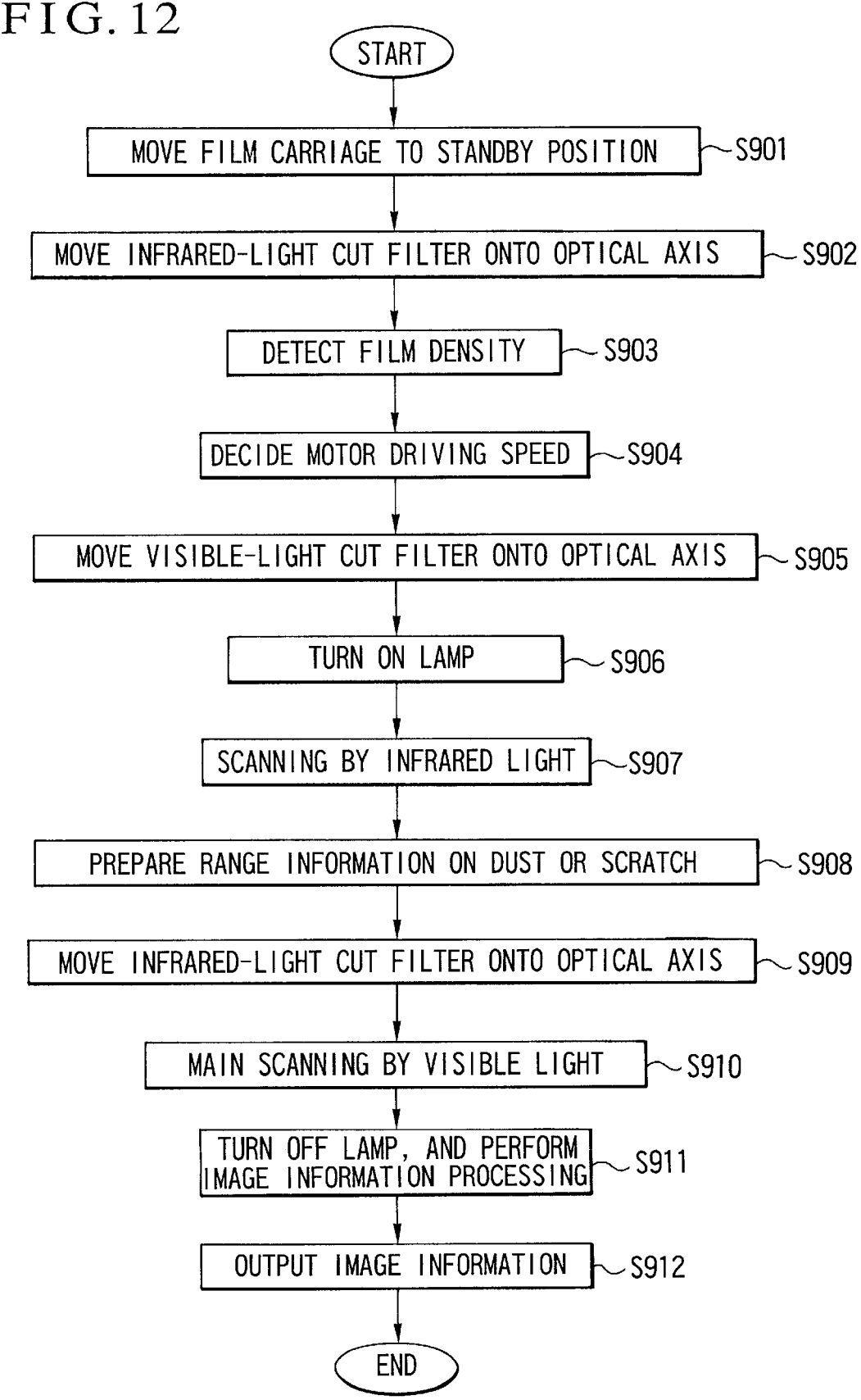

IMAGE READING APPARATUS

BACKGROUND OF THE INVENTION

1. Field of the Invention The present invention relates to an image reading apparatus adapted to a film scanner or the like arranged to read an original such as a developed photographic film.

2. Description of Related Art

Known image reading apparatuses include film image reading apparatuses (hereinafter referred to as film scanners) which are arranged to read images recorded on transparent originals such as developed photographic films. Generally, a film scanner is arranged as follows. A transparent original, such as a microfilm or a photographic film (hereinafter referred to as film), is illuminated from behind the film by an illumination optical system. Then, transmission light from the film is imaged by projecting the light through a projection optical system on an image forming plane of a photoelectric conversion element. An image thus formed is photoelectrically converted by the photoelectric conversion element. Image information recorded on the film is thus electrically converted.

Some of known film scanners are arranged to improve the quality of image data by taking in the image information recorded on the film and by carrying out various processes according to the characteristic of the light source of an illumination optical system which is used for illuminating the film.

For example, a known film scanner is arranged to detect dust or the like sticking to an illumination optical system, a light projection optical system or the surface of the film and to correct an adverse effect of such dust or the like.

FIGS. 8(A) and 8(B) schematically show the adverse effect of dust or the like on image data and an image data output. FIG. 8(A) shows a case where the object to be processed is a reversal film. FIG. 8(B) shows another case where the object to be processed is a negative film.

In either case where the object to be processed is a reversal film or a negative film as shown in FIG. 8(A) or 8(B), when the film scanner reads recorded image information from the film by converting the image information into an image signal, i.e., image data, the dust or the like sticking to the film appears in the form of black spots.

As a result, in the case of the reversal film as shown in FIG. 8(A), if the image data obtained by the film scanner is processed, including a gamma correction, etc., and is outputted as it is for printing or the like, the adverse effect of the dust or the like appears as the black spots.

In a case where the object to be processed is a negative film as shown in FIG. 8(B), the image data obtained by the film scanner is converted from a negative image into a positive image by carrying out a subtracting operation on the image data read out at its full level. In that case, the adverse effect of dust or the like appears on an image output as white luminescent spots.

To solve this problem, a film scanner has been developed, in respect of the transmission characteristic of the film for infrared light, to detect only such an image area that image-deteriorating dust or the like exists, through infrared light passing through the film, and to correct the image data read out from the film on the basis of information on the image area found to have the dust or the like existing there (hereinafter referred to as dust information).

FIG. 9 is a perspective view showing the essential parts of the above-stated film scanner 800. FIG. 10 shows in outline the arrangement of the film scanner 800. FIG. 11 is a block diagram showing the internal circuit arrangement of the film scanner 800 shown in FIG. 9. FIG. 12 is a flow chart showing control over the actions of the entirety of the film scanner 800 shown in FIG. 9.

Referring to FIGS. 9 and 10, a film carriage 801 is used as an original-placing board. A film 802 which has been developed is fixed in place on the film carriage 801. A lamp 803 is arranged to be a visible and infrared light source and has a wide range of light-emitting characteristics including both a visible light wavelength region and an infrared wavelength region.

The film scanner 800 further includes a mirror 804, an image forming lens 805 and a line sensor 806 which is composed of a CCD or the like. The light emitted from the lamp 803 passes through the film 802 and is reflected by the mirror 804 to be imaged on the line sensor 806 by the lens 805. The line sensor 806 has a light receiving area composed of three light receiving parts including a red (R) light receiving part, a green (G) light receiving part and a blue (B) light receiving part. The line sensor 806 is thus arranged to be sensitive to red, green and blue light wavelengths and to be also sensitive to infrared light at least in part at the red (R), green (G) and blue (B) light receiving parts.

A motor 807 is arranged to move the film carriage 801 in the directions of scanning as indicated by arrows in FIGS. 9 and 10. A carriage sensor 808 is arranged to detect the position of the film carriage 801. A dotted line 809 indicates an optical axis leading from the lamp 803 to the line sensor 806.

An infrared-light cut filter 810a is arranged to cut off infrared light. A visible-light cut filter 810b is arranged to cut off visible light. Hereinafter, these filters together will be sometimes referred to as the filter 810.

A filter motor 811 is arranged to move the filter 810 (filters 810a and 810b). The infrared-light cut filter 810a and the visible-light cut filter 810b can be set selectively at a position on the optical axis 809 by changing use of them from one over to the other.

The film scanner 800 is provided with a control circuit 812 (a film scanner control circuit), a lens holder 813, a film scanner armoring case 814, an input/output terminal 815, a density sensor 816 for detecting the density of the film 802, and a filter sensor 817 for detecting the position of the filter 810.

The lamp 803, the line sensor 806, the motor 807, the carriage sensor 808, the filter motor 811, the density sensor 816, the filter sensor 817 and the input/output terminal 815 are electrically connected respectively to the control circuit 812.

As shown in FIG. 11, the control circuit 812 is composed of a carriage sensor control circuit 812a, a density sensor control circuit 812b, a filter sensor control circuit 812c, a motor control circuit 812d, a filter motor control circuit 812e, an image information processing circuit 812f, a lamp control circuit 812g, a line sensor control circuit 812h, a film density detecting circuit 812i, a motor driving speed deciding circuit 812j and an image information storing circuit 812k.

The film scanner 800 which is arranged as described above operates as shown in FIG. 12 which is a flow chart. The operation is described as follows.

Step S901: When a command to perform a film reading action is inputted to the control circuit 812 from outside through the input/output terminal 815, the carriage sensor control circuit 812*a* detects the position of the film carriage 801 through the carriage sensor 808. The result of detection is sent to the motor control circuit 812*d*. Then, the motor control circuit 812*d* drives the motor 807 to bring the film carriage 801 to a predetermined standby position.

Step S902: The filter sensor control circuit 812*c* detects the position of the filter 810 through the filter sensor 817. Information on the result of detection is transmitted to the filter motor control circuit 812*e*. In accordance with this information, the filter motor control circuit 812*e* drives the filter motor 811 to set the infrared-light cut filter 810*a* on the optical axis 809. The infrared-light cut filter 810*a* is moved onto the optical axis 809 accordingly.

Step S903: The film density detecting circuit 812*i* detects the density of the film 802 through the density sensor 816.

Step S904: A motor driving speed is decided on the basis of density information detected at the step S903.

Step S905: The filter sensor control circuit 812*c* then detects the position of the filter 810 through the filter sensor 817. Information on the result of detection is sent to the filter motor control circuit 812*e*. In accordance with this information, the filter motor control circuit 812*e* drives the filter motor 811 to set the visible-light cut filter 810*b* on the optical axis 809. The visible-light cut filter 810*b* is moved onto the optical axis 809 accordingly.

Step S906: The lamp control circuit 812 causes the lamp 803 to light up.

Step S907: The motor control circuit 812*d* causes the motor 807 to rotate in the predetermined direction at a driving speed decided at the step S904. With the motor 807 thus caused to rotate, a scanning action is performed for obtaining the image data of the film 802 by infrared light. While the scanning action is in process, image data outputted from the line sensor 806 is transmitted to the image information processing circuit 812*f* through the line sensor control circuit 812*h*.

Step S908: The image information processing circuit 812*f* detects an area on the film 802 where the transmission factor for infrared light differs by a predetermined value or more from most of other areas of the film 802, by using the image data obtained at the step S907. Then, information on the image area where dust or scratch exists (hereinafter referred to as dust information) is prepared according to the result of detection. The dust information prepared is stored in the image information storing circuit 812*k*.

Step S909: The filter sensor control circuit 812*c* detects the position of the filter 810 through the filter sensor 817. The filter motor control circuit 812*e* then drives the filter motor 811, on the basis of the result of detection, to move the infrared-light cut filter 810*a* onto the optical axis 809.

Step S910: The motor control circuit 812*d* causes the motor 807 to reversely rotate at the motor driving speed decided at the step S904. As a result of this, a scanning action is performed to obtain image data with visible light. While the scanning action is in process, the image data outputted from the line sensor 806 is transmitted to the image information processing circuit 812*f* through the line sensor control circuit 812*h*.

Step S911: Upon completion of the scanning action, the lamp control circuit 812*g* puts out the lamp 803. Meanwhile, the image information processing circuit 812*f* acquires the dust information stored in the image information storing circuit 812*k*.

Step S912: Upon completion of the film image reading operation of the film scanner 800, the image information processing circuit 812*f* corrects, on the basis of the dust information acquired from the image information storing circuit 812*k* at the step S911, the image data of the film 802 obtained with visible light at the step S910. The image data thus corrected is outputted through the input/output terminal 815.

The film scanner 800 is arranged and operates to detect and correct the adverse effect of dust or the like existing on the film, in the above-stated manner.

With the conventional film scanner arranged to detect and correct the adverse effect of dust or the like existing on the film as described above, if the film scanner is arranged to illuminate the film by using a single light source, the light source must be arranged to have such a characteristic that covers a wide range of wavelengths including infrared light as well as visible light. The image sensor to be used also must be arranged to have a sensitivity characteristic corresponding to the wavelength characteristic of the light source.

However, there is no light source that gives a sufficient light quantity over the wide wavelength range including up to the wavelength region of infrared light. Besides, two-dimensional image sensors that are generally used for facsimile systems and copying machines have a low sensitivity to the infrared wavelength region. It has been, therefore, difficult to arrange a combination of a light source and an image sensor to be capable of adequately detecting the dust or the like.

To solve this problem, it has been developed to illuminate a film by using a dichroic mirror to lead a light flux from a light source having a sufficient light quantity in a visible light wavelength region and a light flux from a light source having a sufficient light quantity in an infrared wavelength region to one and the same optical path for illuminating the film.

For example, a film scanner disclosed in Japanese Laid-Open Patent Application No. HEI 5-260256 is arranged to have a dichroic mirror arranged to lead light fluxes coming from light sources of different wavelengths to one and the same optical path to use them one after another for illuminating the film. In the case of this film scanner, the light sources, or white light sources, having different wavelengths are arranged to blink at a high speed of the order of several msec. Then, image data is obtained by processing the output of an image sensor in synchronism with the timing of the blinking light.

However, a film scanner of the kind using a line sensor having lines of three colors R, G and B is often arranged to obtain a sufficient light quantity by using a white light source such as a fluorescent lamp or the like. For such film scanners, it is hardly possible to arrange light sources to blink at a high speed like the arrangement disclosed in Japanese Laid-Open Patent Application No. HEI 5-260256. With the film scanners of the kind using such a white light source, therefore, it is hardly possible to obtain a sufficient light quantity for detecting dust or the like existing on the film.

Further, in the case of a fluorescent lamp which is a cold cathode lamp, the lamp requires a considerably long time before a light emission characteristic stabilizes after a power supply is turned on. In a case where such a fluorescent lamp is used as a light source, therefore, the light source must be kept lighting while the scanner is in operation.

BRIEF SUMMARY OF THE INVENTION

It is an object of the invention to provide an image reading apparatus capable of accurately detecting dust or the like existing on an original, in reading images recorded on the original, by obtaining a sufficient light quantity in each wavelength region and stably controlling a light source, so that images on the original can be obtained in a state of having a high image quality.

To attain the above object, in accordance with an aspect of the invention, there is provided an image reading apparatus, which comprises a plurality of light emission means for illuminating an original, the plurality of light emission means having respective different light emission wavelength characteristics, image pickup means for reading an image recorded on the original, reflection means, having a characteristic of reflecting a predetermined wavelength component, for leading light from each of the plurality of light emission means to the original, and light emission control means for controlling light emission of the plurality of light emission means.

With the image reading apparatus arranged in the above-stated manner according to the invention, in reading an image recorded on the original, light of each wavelength region is obtained in sufficient quantity and the light sources are stably controlled to permit accurate detection of dust or the like existing on the original, so that the image on the original can be obtained, or reproduced, in a state of having a high quality.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 6 is a block diagram showing the arrangement of a control circuit of the film scanner shown in FIG. 5.

FIG. 7 is a flow chart showing the operation of the film scanner shown in FIG. 5.

FIG. 12 is a flow chart showing the operation of the conventional film scanner.

DETAILED DESCRIPTION OF THE INVENTION

Hereinafter, preferred embodiments of the invention will be described in detail with reference to the drawings.
(First Embodiment)

Figure 1:
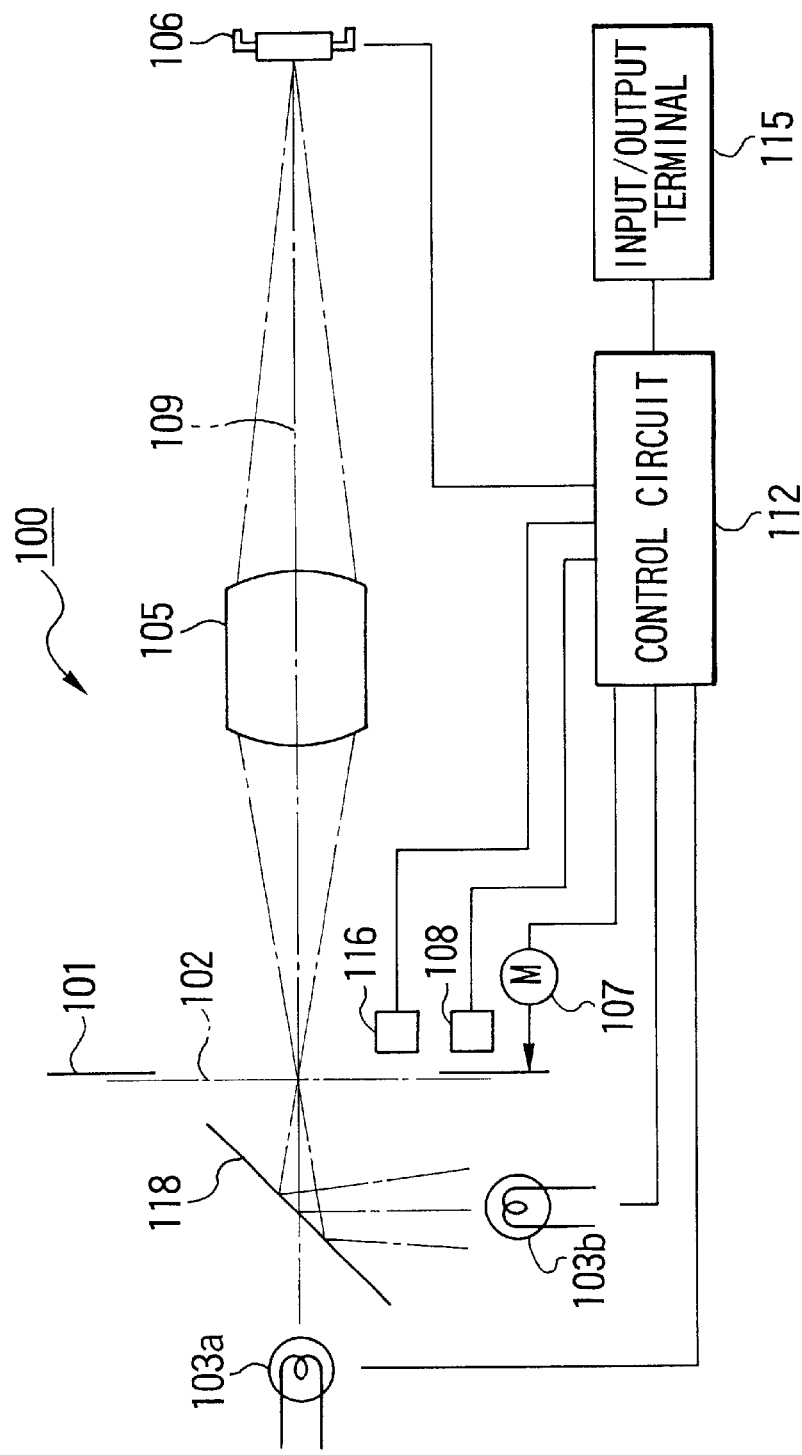
FIG. 1 is a block diagram showing a film scanner according to a first embodiment of the invention.

The first embodiment of the invention is applicable, for example, to a film scanner 100, which is arranged as shown in FIG. 1.

The film scanner 100 is arranged to read image information recorded on a transparent (light-transmissive) original such as a microfilm or a photographic film (hereinafter referred to as the film). Referring to FIG. 1, the film scanner 100 includes a film carriage 101 which serves as an original-placing board to be used for placing a film 102 thereon, light sources 103a and 103b arranged to emit a visible light flux and an infrared light flux, respectively, to be used for illuminating the film 102 which is immovably set on the film carriage 101, a dichroic mirror 118 arranged to reflect infrared light, a line sensor 106 which is composed of a CCD, etc., a lens (image forming lens) 105 arranged to image the light passing through the film 102 on the line sensor 106, a motor 107 arranged to move the film carriage 101 in the direction of scanning, a carriage sensor 108 arranged to detect the position of the film carriage 101, a control circuit 112 arranged to preside control over the actions of the whole film scanner 100, an input/output terminal 115 for inputting and outputting of image information, etc., and a density sensor 116 arranged to detect the density of the film 102.

In FIG. 1, reference numeral 109 denotes an optical axis leading from the light sources 103a and 103b to the line sensor 106.

In the film scanner 100, the line sensor 106 has three light receiving areas including a red (R) light receiving part, a green (G) light receiving part and a blue (B) light receiving part. The line sensor 106 is thus arranged to be sensitive to the light wavelengths of red, green and blue colors. In addition to that, each of the red (R), green (G) and blue (B) light receiving parts is sensitive at least in part to infrared light.

The light sources 103a and 103b, the line sensor 106, the motor 107, the carriage sensor 108, the density sensor 116 and the input/output terminal 115 are electrically connected respectively to the control circuit 112.

Figure 2:
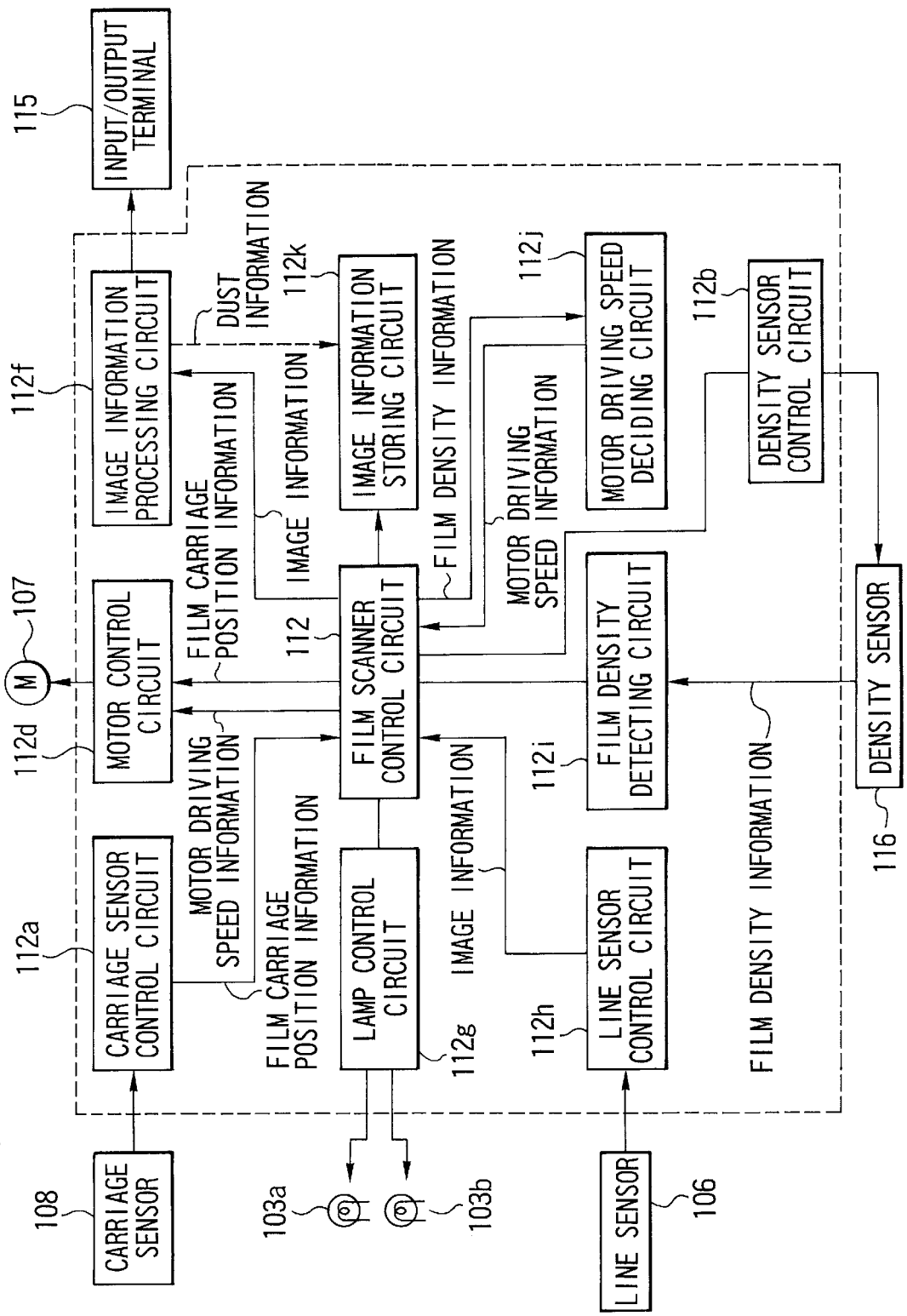
FIG. 2 is a block diagram showing the arrangement of a control circuit of the film scanner shown in FIG. 1.

The control circuit 112 (a film scanner control circuit) is, for example, arranged as shown in FIG. 2 to include a carriage sensor control circuit 112a arranged to control the film carriage 101, a density sensor control circuit 112b arranged to control the density sensor 116, a motor control circuit 112d arranged to control the motor 107, an image information processing circuit 112f arranged to process, in a prescribed manner, image data obtained by a scanning action on the film 102, a lamp control circuit 112g arranged to control the light sources 103a and 103b, a line sensor control circuit 112h arranged to control the line sensor 106, a film density detecting circuit 112i arranged to detect the density of the film 102 through the density sensor 116, a motor driving speed deciding circuit 112j arranged to decide the driving speed of the motor 107, and an image information storing circuit 112k arranged to store information of varied kinds including the image data.

Figure 9:
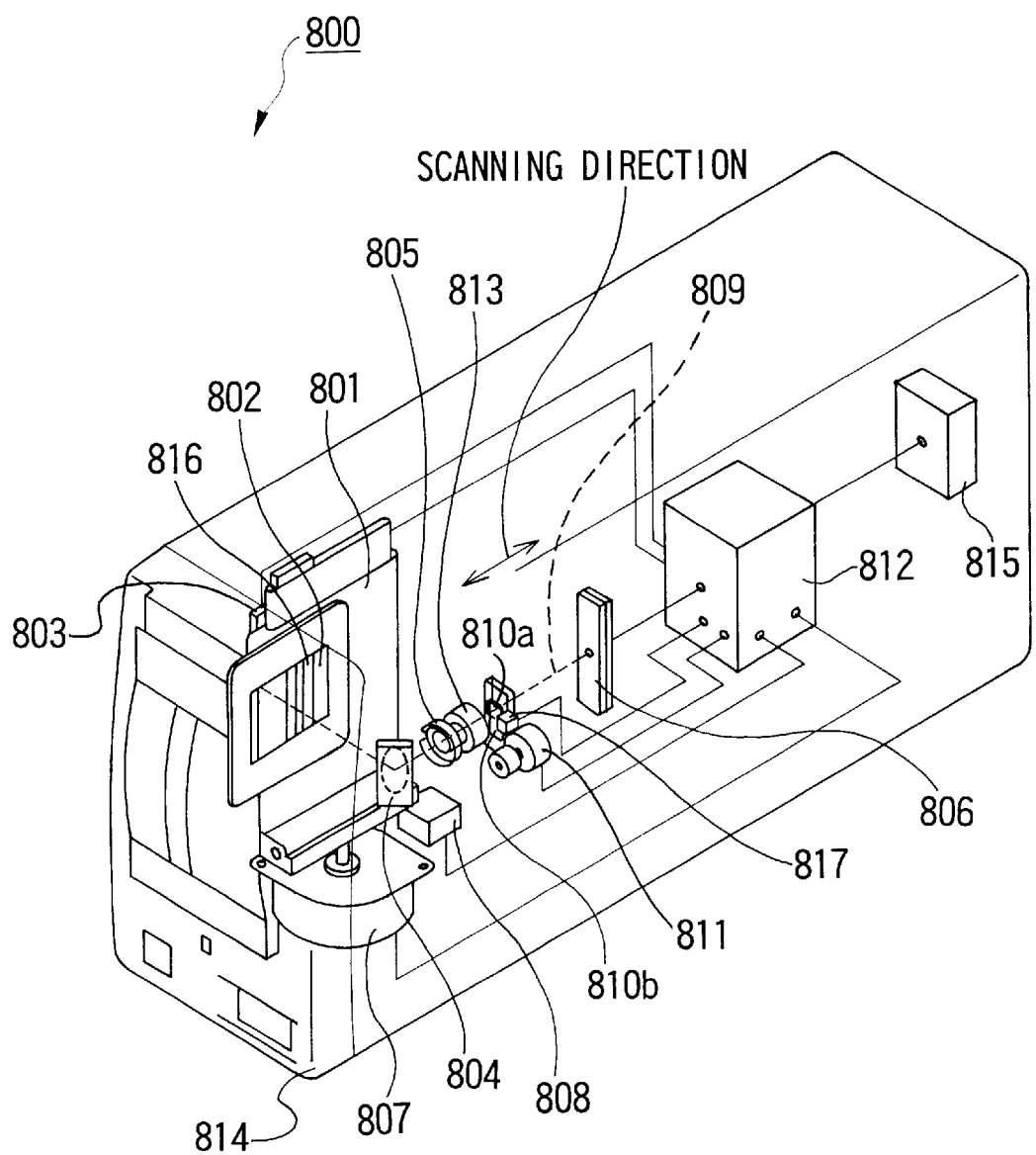
FIG. 9 is a perspective view showing essential parts of the conventional film scanner.
Figure 10:
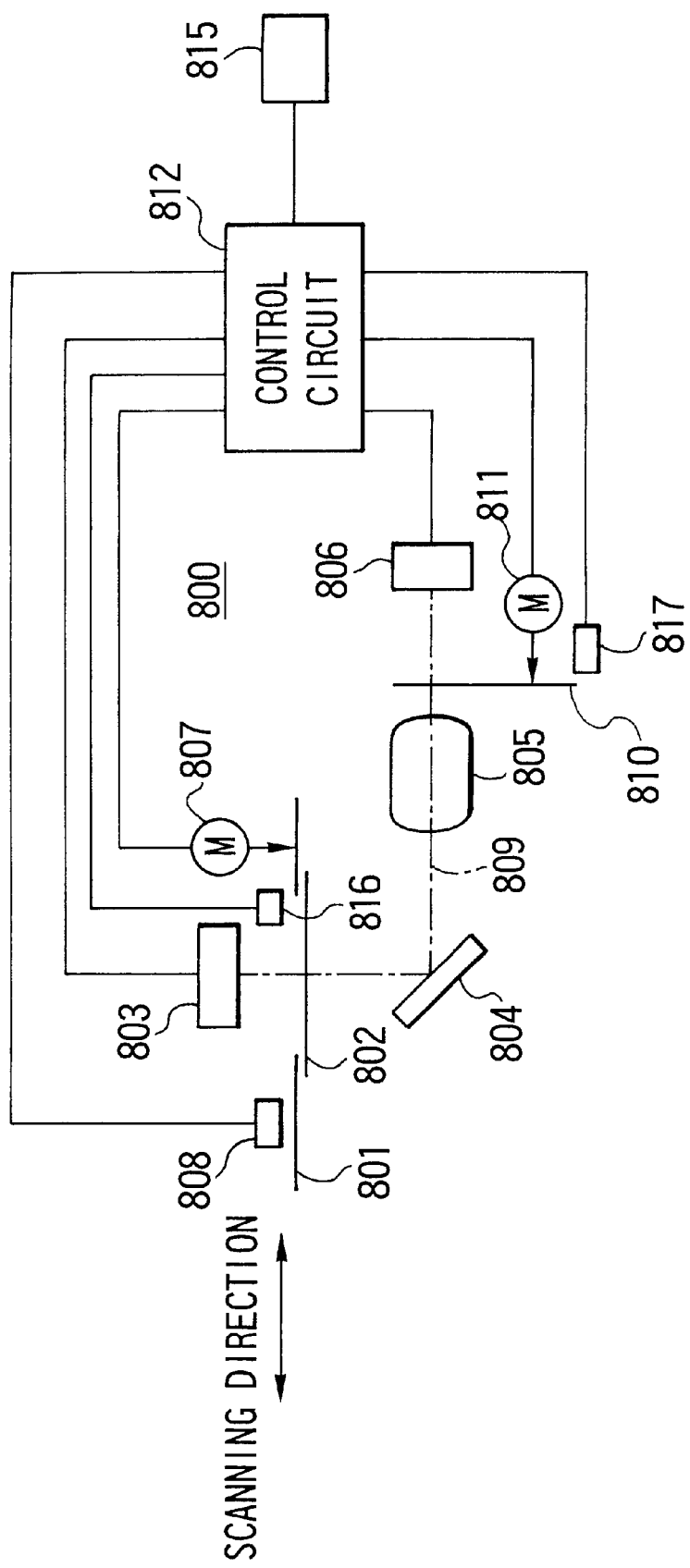
FIG. 10 is a block diagram showing the arrangement of the conventional film scanner.
Figure 11:
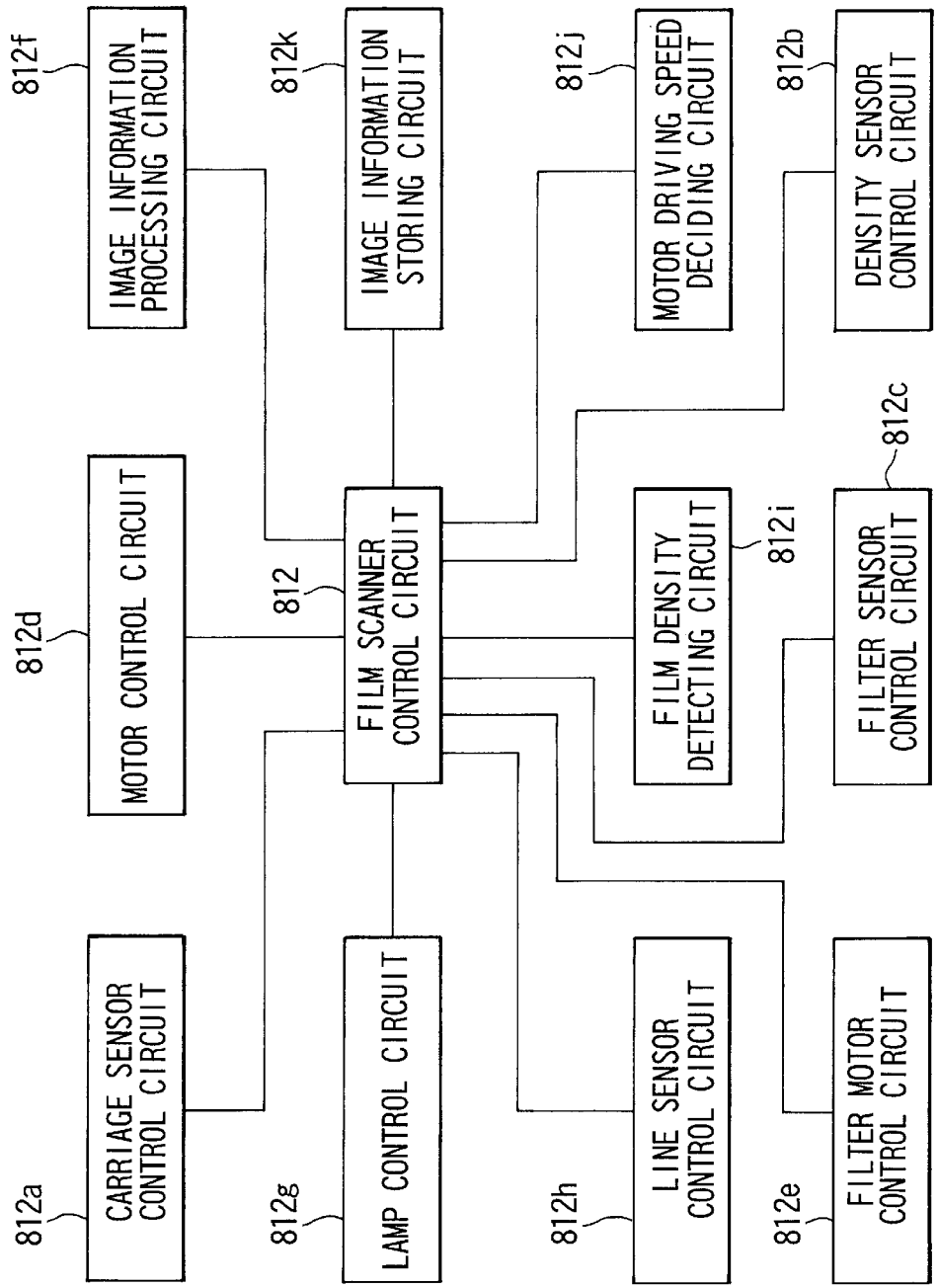
FIG. 11 is a block diagram showing the arrangement of a control circuit of the conventional film scanner.

The conventional film scanner 800 which is shown in FIGS. 9, 10 and 11 and the film scanner disclosed in Japanese Laid-Open Patent Application No. HEI 5-260256, etc., are arranged, as described in the foregoing, to have the infrared-light cut filter (810a) attached by vapor deposition or the like to the lens (805) and to have the various members, such as the filter motor (811), etc., arranged to set the infrared-light cut filter on the optical axis (809). These members are not included in the arrangement of the first embodiment of the invention.

Further, while the conventional film scanner 800 shown in FIGS. 9, 10 and 11 is arranged to rectangularly bend the transmission light of the film 802 before it reaches the lens 805, the film scanner 100 according to the first embodiment of the invention is arranged not to bend the transmission light of the film 102.

While the first embodiment is arranged not to bend the transmission light of the film 102, the light may be arranged to be bent a plurality of times between the film and the focal plane by means of mirrors or the like. In other words, the first embodiment may be arranged either to bend the transmission light or not to bend it at all.

Further, in the film scanner 100 according to the first embodiment, two light sources 103a and 103b are used as illumination light sources.

The light source 103a is arranged to give a sufficient light quantity mainly in a visual light wavelength region. The other light source 103b is arranged to have a characteristic of giving only wavelength of an infrared light component. For example, a fluorescent lamp may be used as the light source 103a and an LED may be used as the light source 103b.

The light source 103a is disposed on the optical axis 109, while the light source 103b is disposed at a position in the direction approximately perpendicular to the optical axis 109.

The dichroic mirror 118, which is arranged to reflect infrared light, is disposed at an angle of about 45° on a point where the optical path of the light source 103b and the optical axis 109 intersect with each other. With the light sources 103a and 103b and the dichroic mirror 118 disposed in the above manner, a visible light component emitted from the light source 103a passes through the dichroic mirror 118 to be used to illuminate the film 102, and an infrared light component from the light source 103a is reflected by the dichroic mirror 118 to be removed. Further, a light flux from the light source 103b (infrared light component) is reflected by the dichroic mirror 118 to be used to illuminate the film 102. With the above arrangement employed, light fluxes having visible light and infrared light components are usable to illuminate the film 102.

Figure 3:
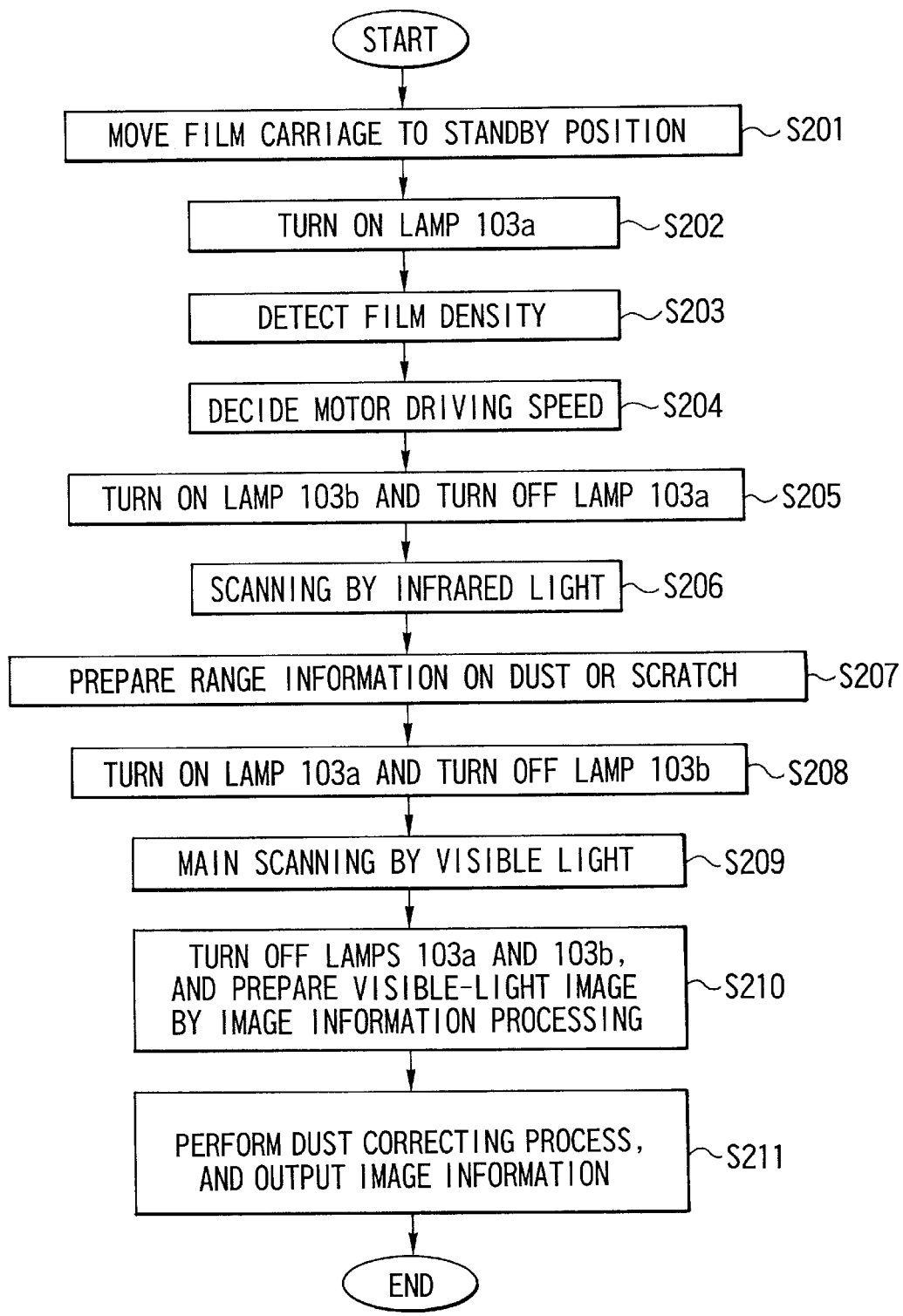
FIG. 3 is a flow chart showing the operation of the film scanner shown in FIG. 1.

With the film scanner 100 arranged according to the invention as described above, the film scanner 100 operates, for example, as shown in FIG. 3, which is a flow chart showing processes to be executed. A program for these processes is stored beforehand in a program memory included in the control circuit 112. Referring to FIG. 3, with the program read out and executed by the control circuit 112, the film scanner 100 operates as follows.

Step S201: When a command to perform a film reading operation is inputted to the control circuit 112 from outside through the input/output terminal 115, the carriage sensor control circuit 112a detects the position of the film carriage 101 through the carriage sensor 108. The result of detection, i.e., film carriage position information, is sent to the motor control circuit 112d. Then, the motor control circuit 112d drives the motor 107 to bring the film carriage 101 to a predetermined standby position. At this time, the lamp control circuit 112g allows the light source (lamp) 103a and the light source (lamp) 103b to remain extinct.

Step S202: After the step S201, when a command to turn on a power supply switch is inputted to the control circuit 112, the lamp control circuit 112g causes the light source 103a to light up.

Step S203: Next, the film density detecting circuit 112i detects the density of the film 102 through the density sensor 116. The result of detection, i.e., film density information, is sent to the motor driving speed deciding circuit 112j.

Step S204: The motor driving speed deciding circuit 112j decides a driving speed of the motor 107 on the basis of the film density information from the film density detecting circuit 112i. Information on this decision, i.e., motor driving speed information, is sent to the motor control circuit 112d.

Step S205: The lamp control circuit 112g causes the light source 103b to light up and the light source 103a to be put out.

Step S206: The motor control circuit 112d causes the motor 107 to rotate in a predetermined direction at a driving speed based on the motor driving speed information transmitted from the motor driving speed deciding circuit 112j at the step S204. With the motor 107 thus caused to rotate, a scanning action is performed for obtaining image information of the film 102 by infrared light of the light source 103b. While the scanning action is in process, image information (image data) outputted from the line sensor 106 is sent to the image information processing circuit 112f through the line sensor control circuit 112h.

Step S207: The image information processing circuit 112f detects an area on the film 102 where the transmission factor for infrared light differs by a predetermined value or more from most of other areas of the film 102, by using the image data obtained by the scanning action at the step S206. Then, information on the image area where dust or scratch exists, i.e., dust information, is prepared according to the result of detection. The dust information prepared is temporarily stored in the image information storing circuit 112k.

Step S208: The lamp control circuit 112g then causes the light source 103a to light up and the light source 103b to be put out.

Step S209: The motor control circuit 112d causes the motor 107 to rotate in the direction opposite to the rotating direction used in the case of the infrared light at a driving speed based on the motor driving speed information transmitted from the motor driving speed deciding circuit 112j at the step S204. As a result of this, a scanning action for obtaining image information of the film 102 with visible light of the light source 103a, i.e., a main scanning action, is performed. While the scanning action is in process, image information (image data) outputted from the line sensor 106 is transmitted to the image information processing circuit 112f through the line sensor control circuit 112h.

Step S210: Upon completion of the main scanning action, the lamp control circuit 112g causes the light sources 103a and 103b to be put out. Then, the image information processing circuit 112f reads and acquires the dust information which has been temporarily stored in the image information storing circuit 112k at the step S207. With this step S210 executed, the reading action on the image information of the film 102 comes to an end.

Step S211: The image information processing circuit 112f corrects the image data sent from the line sensor control circuit 112h at the step S209 (image data of the film 102 read with visible light) on the basis of the dust information acquired from the image information storing circuit 112k at the step S210. After correction, the image data is outputted through the input/output terminal 115.

In the first embodiment, as described above, in scanning for detecting dust or the like on the film 102, the light source 103b is lighted up and the light source 103a is put out by the lamp control circuit 112g. The film 102 is thus scanned first with the infrared light to obtain image information with the infrared light. An area where dust or the like exists on the film 102 is detected from the image information. In performing the main scanning with the visible light, the light source 103b is put out and the light source 103a is lighted up by the lamp control circuit 112g. The film 102 is scanned with the visible light to obtain image data. The image data thus obtained by the main scanning action is corrected according to the information on the area having dust or the like on the film 102 (dust information).

In other words, control over the lighting-extinguishing action on the light sources 103*a* and 103*b* is arranged to be performed for each of the scanning actions. This arrangement permits selection of the film illuminating wavelength from between the wavelength of an infrared light obtained by lighting up the light source 103*b* and putting out the light source 103*a* and that of a visible light obtained by putting out the light source 103*b* and lighting up the light source 103*a*. The film 102 thus can be illuminated with a sufficient light quantity even at the wavelength characteristic of infrared light. Besides, by this arrangement, the low sensitivity of the sensor such as a CCD or the like to the infrared wavelength region can be compensated for to obtain image data at a good S/N ratio. Therefore, even in the event of a film having dust or the like existing there, the dust or the like can be accurately detected, and the adverse effect of it can be corrected to obtain images without any image quality deterioration by the presence of dust or the like.

Further, the dichroic mirror 118 which reflects infrared light is disposed, blinking of the light source 103*b* for emitting infrared light is controlled, and an infrared component in illuminating the film 102 with the visible light of the light source 103*a* is cut off. That arrangement obviates the necessity of attaching an infrared-light cut filter to the optical system by vapor deposition, like in the case of the conventional arrangement. The arrangement of the first embodiment, therefore, not only makes it possible to attain the above-stated advantage with the simpler structural arrangement, but also permits reduction in cost.

The angle at which the dichroic mirror 118 and the light source 103*b* are to be set is not limited to the angle set in the first embodiment. The dichroic mirror 118 may be set at some other angle at which the reflection light of it passes approximately a point where the optical path of the light source 103*b* intersects with the optical axis 109 and then comes to coincide with the optical axis 109 according to the law of total reflection.

The first embodiment may be arranged such that the dichroic mirror 118 has a visible light reflecting characteristic, and the light source 103*b* which gives an infrared light component is set on the optical axis 109 while the light source 103*a* which gives a visible light component is set in a position deviating from the optical axis 109.

Figure 4:
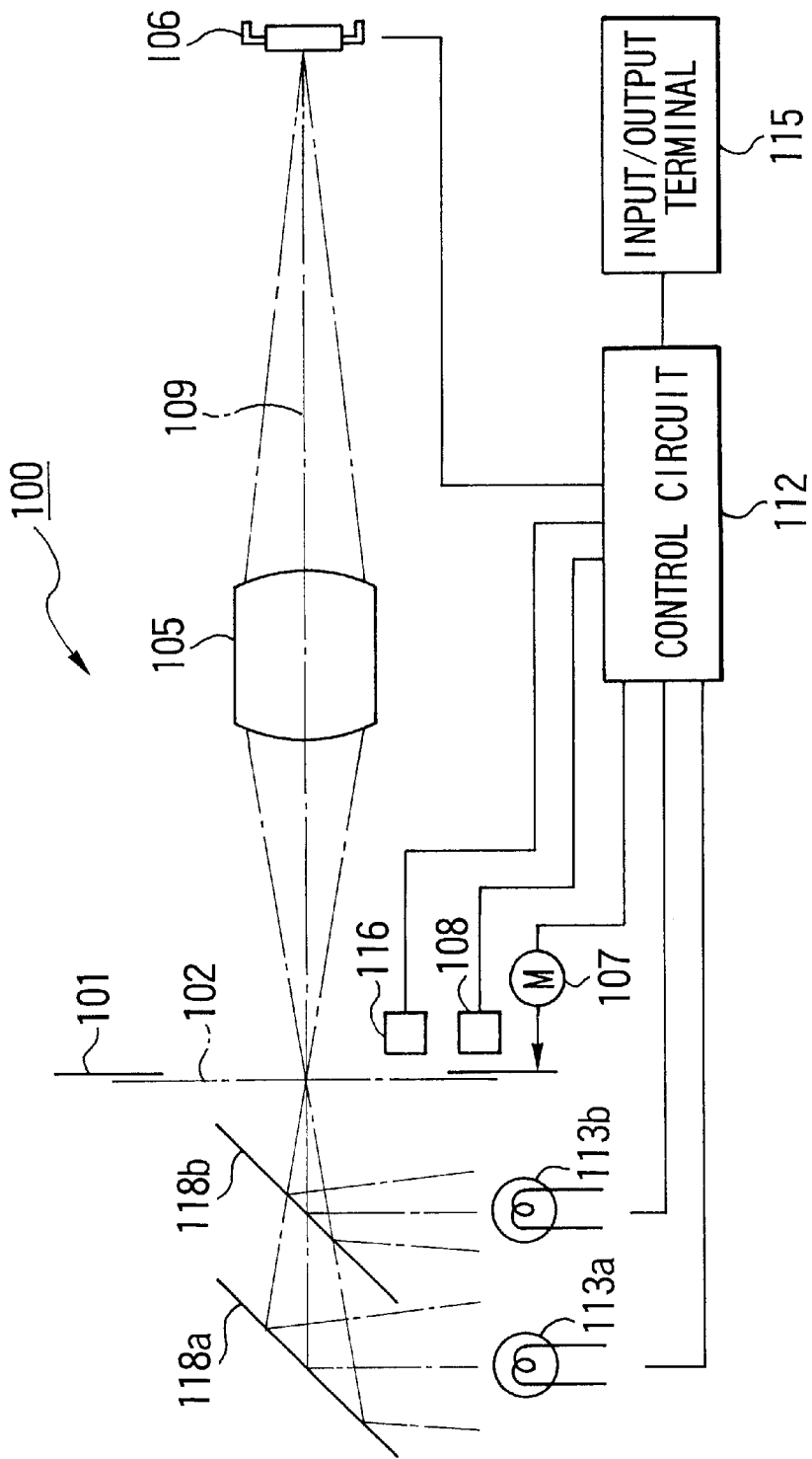
FIG. 4 shows, by way of example, a modification of the arrangement of the film scanner shown in FIG. 1.

Further, in a modification example shown in FIG. 4, the arrangement of the first embodiment is changed to have two dichroic mirrors instead of one. Referring to FIG. 4, the two dichroic mirrors are mirrors 118*a* and 118*b*. The dichroic mirror 118*a* has a characteristic of reflecting visible light. The other dichroic mirror 118b has a characteristic of reflecting infrared light. In this case, the light source 113*a* is directed approximately perpendicular to the optical axis 109 instead of setting the light source 103*a* on the optical axis 109. The modification shown in FIG. 4 is capable of illuminating the film 102 with a light flux having the visible-light and infrared-light components in the same manner as in the case of the first embodiment.

(Second Embodiment)

Figure 5:
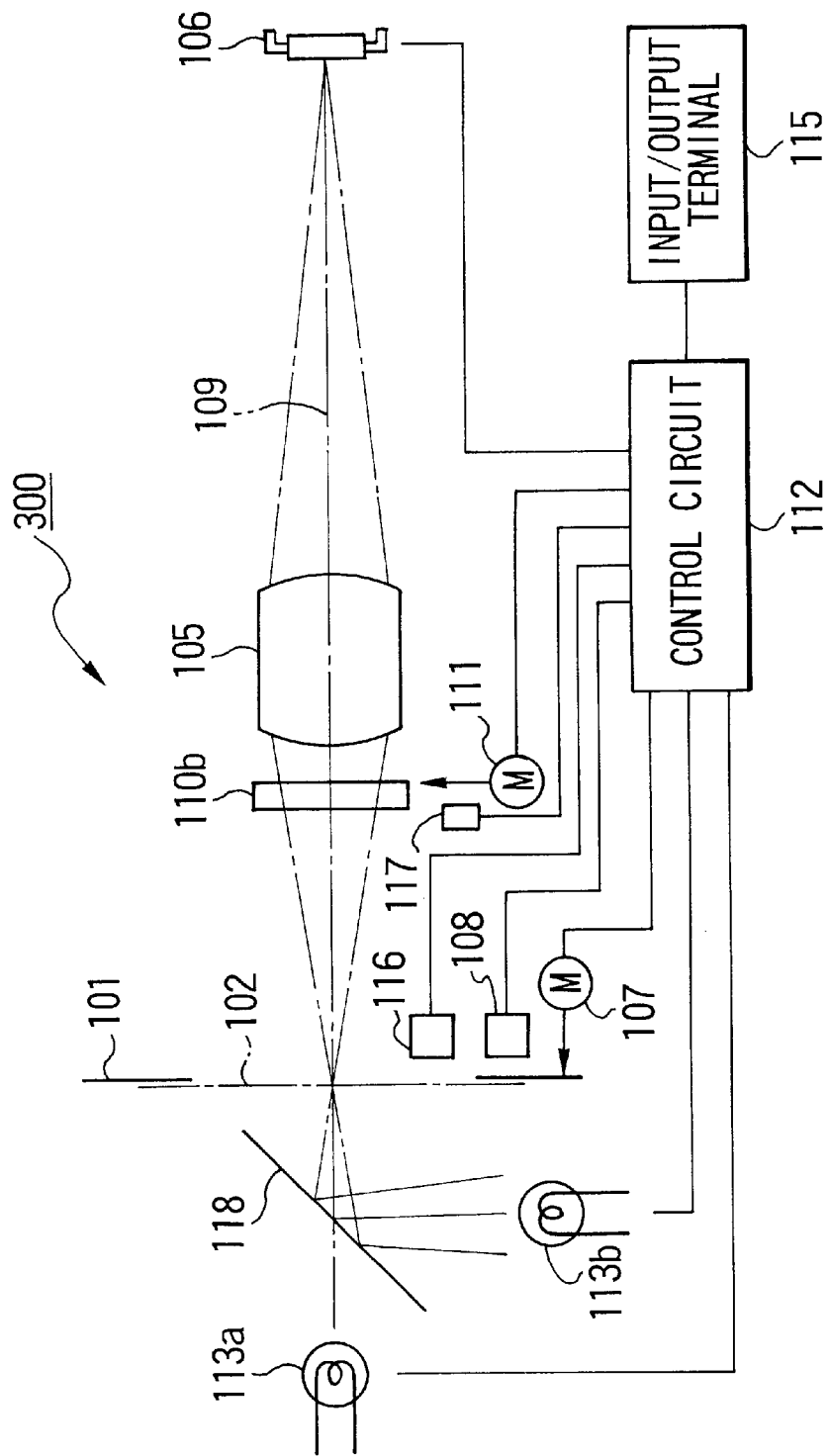
FIG. 5 is a block diagram showing a film scanner according to a second embodiment of the invention.
Figure 8A:
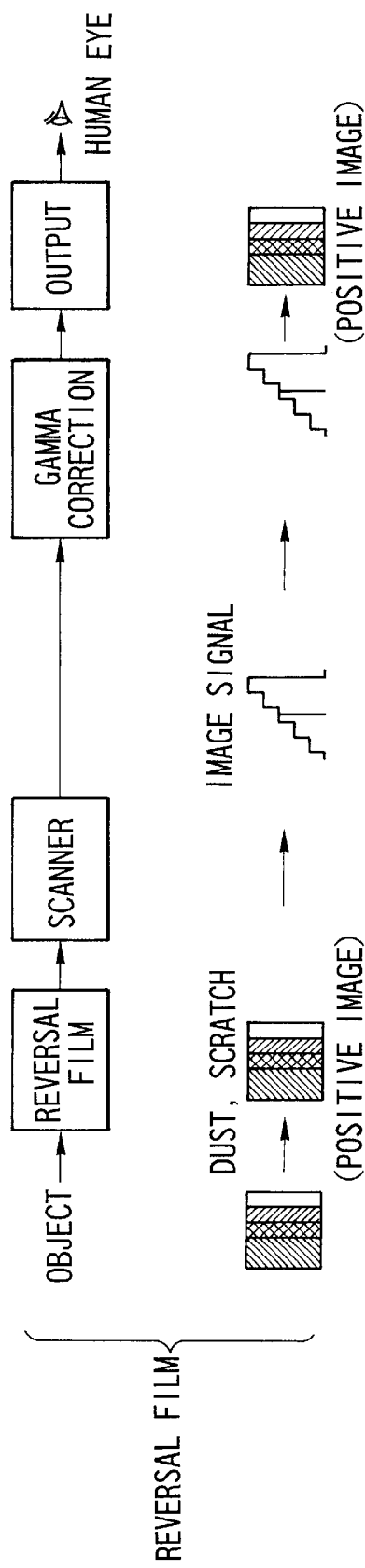
FIGS. 8(A) and 8(B) are diagrams for explaining the adverse effect of dust or the like existing on a film on an output image in the case of a conventional film scanner.
Figure 8B:
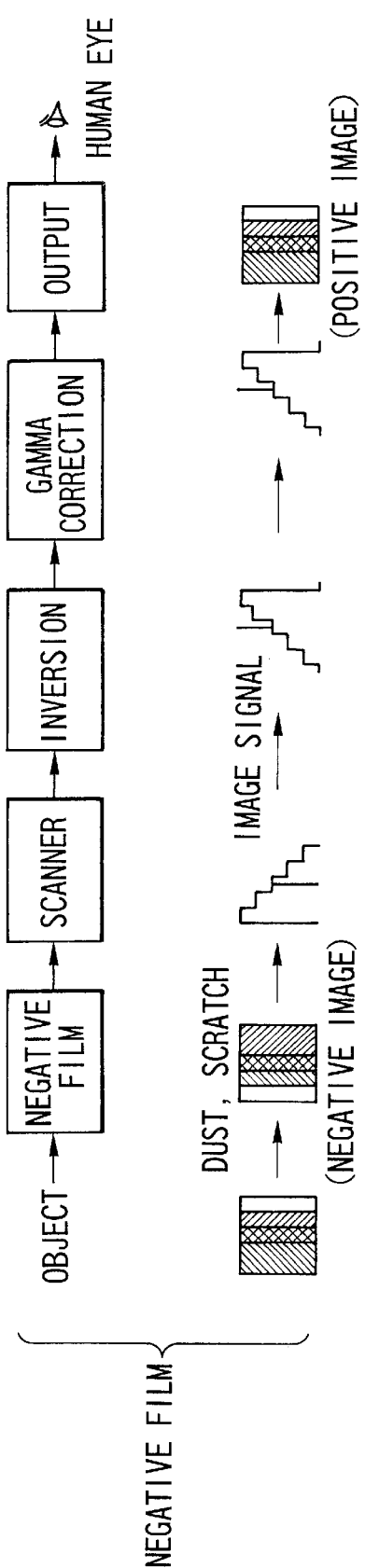

The second embodiment of the invention is applicable to such a film scanner 300 as shown in FIG. 5. The arrangement of the film scanner 300 is about the same as the film scanner 100 shown in FIG. 1 except that a visible-light cut filter 110*b* is arranged to be set inside of an optical path.

Therefore, in addition to the arrangement of FIG. 1, the film scanner 300 in the second embodiment is provided not only with the visible-light cut filter 110*b*, but also with a filter motor 111 which is arranged to move the visible-light cut filter 110*b* and a filter sensor 117 arranged to detect the position of the visible-light cut filter 110*b*. The filter motor 111 and the filter sensor 117 are electrically connected to the control circuit 112. The visible-light cut filter 110*b* is thus arranged to be moved into and out of the optical path.

The control circuit 112 in the second embodiment is arranged as shown in FIG. 6 to include, in addition to the arrangement shown in FIG. 2, a filter motor control circuit 112*e* arranged to control the filter motor 111, and a filter sensor control circuit 112*c* arranged to control the filter sensor 117.

In the film scanner 300 shown in FIG. 5, all parts that act in the same manner as those of the film scanner 100 shown in FIG. 1 (the first embodiment) are denoted by the same reference numerals, and the details of them are omitted from the description. Further, in the control circuit 112 shown in FIG. 6, all parts that act in the same manner as those of the control circuit 112 shown in FIG. 2 are also denoted by the same reference numerals, and the details of them are also omitted from the following description.

The film scanner 300 arranged as described above operates, for example, as shown in FIG. 7, which is a flow chart showing processes to be executed. A program for these processes is stored beforehand in a program memory included in the control circuit 112. Referring to FIG. 7, with the program read out and executed by the control circuit 112, the film scanner 300 operates as described below.

Step S401: When a command to perform a film reading operation is inputted to the control circuit 112 from outside through the input/output terminal 115, the carriage sensor control circuit 112*a* detects the position of the film carriage 101 through the carriage sensor 112*a*. The result of detection, i.e., film carriage position information, is sent to the motor control circuit 112*d*. Then, the motor control circuit 112*d* drives the motor 107 to bring the film carriage 101 to a predetermined standby position. At this time, the lamp control circuit 112*g* allows the light source (lamp) 103*a* and the light source 103*b* (lamp) to remain extinct.

Step S402: After the step S401, when a command to turn on a power supply switch, etc., is inputted to the control circuit 112, the lamp control circuit 112*g*causes the light source 103*a* to light up. At this time, the light source 103*b* remains extinct and the visible-light cut filter 110*b* is at a position retracted from the optical axis 109. Further, at this time, the light from the light source 103*a* has its infrared component cut by the dichroic mirror 118. Therefore, the film 102 is illuminated only with the visible light component of the light of the light source 103*a*.

Step S403: Next, the film density detecting circuit 112*i* detects the density of the film 102 through the density sensor 116. The result of detection, i.e., film density information, is sent to the motor driving speed deciding circuit 112*j*.

Step S404: The motor driving speed deciding circuit 112*j* decides a driving speed of the motor 107 on the basis of the film density information from the film density detecting circuit 112*i*. Information on this decision, i.e., motor driving speed information, is sent to the motor control circuit 112*d*.

Step S405: The filter sensor control circuit 112*c* detects the position of the visible-light cut filter 110*b* through the filter sensor 117. The result of detection, i.e., filter position information, is sent to the filter motor control circuit 112*e*. Then, according to the filter position information, the filter motor control circuit 112*e* drives the filter motor 111 to move the visible-light cut filter 110*b* onto the optical axis 109.

Step S406: The lamp control circuit 112*g* causes the light source 103*b* to light up. With the step S405 and this step S406 executed, an image obtained with the infrared light is formed on the surface of the line sensor 106 through the optical system.

Step S407: The motor control circuit 112d causes the motor 107 to rotate in the predetermined direction at a driving speed based on the motor driving speed information transmitted from the motor driving speed deciding circuit 112j at the step S404. With the motor 107 thus caused to rotate, a scanning action is performed for obtaining image information of the film 102 by infrared light of the light source 103b. While the scanning action is in process, image information (image data) outputted from the line sensor 106 is sent to the image information processing circuit 112f through the line sensor control circuit 112h.

Step S408: The image information processing circuit 112f detects an area on the film 102 where the transmission factor for infrared light differs by a predetermined value or more from most of other areas of the film 102, by using the image data obtained by the scanning action at the step S407. Then, information on the image area where dust or scratch exists, i.e., dust information, is prepared according to the result of detection. The dust information prepared is temporarily stored in the image information storing circuit 112k.

Step S409: The filter sensor control circuit 112c detects the position of the visible-light cut filter 110b through the filter sensor 117. The result of detection, i.e., filter position information, is sent to the filter motor control circuit 112e. Then, according to the filter position information, the filter motor control circuit 112e drives the filter motor 111 to retract the visible-light cut filter 110b from the optical axis 109. The lamp control circuit 112g causes the light source 103b to be put out. As a result, the visible light component alone passes through the film 102 to be imaged again on the line sensor 106.

Step S410: The motor control circuit 112d causes the motor 107 to rotate in the direction opposite to the rotating direction used in the case of the infrared light at a driving speed based on the motor driving speed information transmitted from the motor driving speed deciding circuit 112j at the step S404. As a result of this, a scanning action for obtaining image information of the film 102 with visible light of the light source 103a, i.e., a main scanning action, is performed. While the main scanning action is in process, image information (image data) outputted from the line sensor 106 is transmitted to the image information processing circuit 112f through the line sensor control circuit 112h.

Step S411: Upon completion of the main scanning action, the lamp control circuit 112g causes the light sources 103a and 103b to be put out. Meanwhile, the image information processing circuit 112f reads and acquires the dust information which has been temporarily stored in the image information storage circuit 112k at the step S408. With the step S411 executed, the reading action on the image information recorded on the film 102 come to an end.

Step S412: The image information processing circuit 112f corrects the image data sent from the line sensor control circuit 112h at the step S410 (image data of the film 102 read with visible light) on the basis of the dust information acquired from the image information storing circuit 112k at the step S408. After correction, the image data is outputted through the input/output terminal 115.

The arrangement described above enables the second embodiment to illuminate the film 102 with a sufficient light quantity even at the infrared wavelength characteristic and to compensate for the low sensitivity to the infrared wavelength region of the sensor such as a CCD or the like, in the same manner as the first embodiment, so that image data is obtainable at a good S/N ratio. Even in a case where dust or the like exists on the film, the second embodiment accurately detects the dust or the like and corrects the adverse effect of it, so that images can be outputted in a state of not being deteriorated by the presence of dust or the like.

While each of the first and second embodiments is arranged to use two light sources 103a and 103b, the number of light sources is not limited to two. A lager number of light sources may be arranged. In that case, the number of dichroic mirrors is increased accordingly. Further, the light source to be caused to blink at the time of each scanning action is selected according to the wavelength at which the film 102 is to be illuminated.

Further, in the first and second embodiments described above, the term "scanning action" means to do scanning by causing the film carriage 101 to make a reciprocal motion. The light sources 103a and 103b can be caused to blink either at the time of change from the forward stroke over to the backward stroke of the reciprocal motion of the film carriage 101 or at the time of scanning by the reciprocal motion. In either case, the light sources 103a and 103b are controlled to be lighted up and to be put out every time image information recorded on the film 102 is inputted.

It goes without saying that the object of the invention is attainable also by providing a system or an apparatus with a storage medium which stores therein a software program code for carrying out the host and terminal functions of each of the embodiments disclosed above and by allowing the computer (CPU or MPU) of the system or the apparatus to execute the program code by reading it out from the storage medium. In that instance, the program code serves to realize the functions of the embodiments disclosed and the storage medium is considered to represent the embodiments of the invention.

The storage medium which supplies the program code can be selected from among various media such as a ROM, a floppy disk, a hard disk, an optical disk, a magneto-optical disk, a CD-ROM, a CDR, a magnetic tape, a nonvolatile memory card, etc.

Further, with a computer arranged to execute the program code read out, it goes without saying that not only the functions of the embodiments are realized thereby but also an OS (operating system) or the like operating on the computer may be used to perform, according to the command of the program code, the actual processes either in part or in their entirety in such a way as to carry out the functions of the embodiments disclosed.

Further, it is also possible that, after the program code read out from the storage medium is written into an extended function board inserted in the computer or into a function extending unit connected to the computer, a CPU or the like provided on the extended function board or the function extending unit performs, according to the command of the program code, the actual processes either in part or in their entirety to carry out the functions of the embodiments disclosed.

Each of the embodiments disclosed is arranged to illuminate a transmissive or transparent original, such as a developed photographic film or the like, with a plurality of light emission means which differ from each other in wavelength characteristic. Then, one of the wavelength characteristics of light fluxes coming from the light emission means is selected by reflection means which reflects a predetermined wavelength component. Further, for each of scanning actions to be carried out by the reciprocal motion of the original-placing board relative to image pickup means, the lighting and extinguishing actions of the plurality of light emission means are controlled.

More specifically, a second light emission means which emits an infrared light component, or a first wavelength component, is set at a position approximately perpendicular to an optical axis leading to a line sensor (image pickup means) from a first light emission means which emits a visible light component, or a second wavelength component. Meanwhile, a dichroic mirror, i.e., reflection means, which reflects the infrared light component (first wavelength component) is set at an angle approximately 45 degrees on a point where the optical path of the second light emission means intersects with the optical axis. By this arrangement, when the first light emission means is lighted up, the infrared light component of the light flux emitted by the first light emission means is reflected by the dichroic mirror while the remaining visible light component of the light flux is alone allowed to pass through the film, i.e., the transmissive original, to be imaged on the line sensor. When the second light emission means is lighted up, its light (infrared light component) is reflected by the dichroic mirror to pass through the film and is thus imaged on the line sensor.

For the scanning action which is first performed to detect dust or the like on the film, the second light emission means is caused to be lighted up and the first light emission means to be extinct. In this instance, the light (infrared light) from the second light emission means is reflected by the dichroic mirror to be led to the film. Therefore, the film is illuminated with a sufficient quantity of infrared light from the second light emission means for detection of dust or the like. Then, the light passing through the film is imaged on the line sensor. With image information thus obtained, information on an area having dust or the like on the film, i.e., dust information, is obtained by detecting an area where a transmission factor for infrared light differs by a predetermined value or more from most of other areas of the film.

For the main scanning after the dust-detecting scanning, the second light emission means is put out and the first light emission means is lighted up. In this case, an infrared light component included in the light of the first light emission means (composed of infrared light and visible light) is reflected by the dichroic mirror and only the light of a remaining visual light component is led to the film. The film is thus illuminated only with the light of the visual light component. Then, the light thus allowed to pass through the film is imaged on the line sensor. Image information thus obtained is subjected to a correction process, which is performed on the basis of the dust information obtained by the dust-detecting scanning under the infrared light illumination.

In carrying out these scanning actions, the lighting and extinguishing actions on the first and second light emission means are arranged to be controlled for each of these scanning actions. This arrangement permits selection of a transmissive original illuminating wavelength characteristic for each of scanning actions. Therefore, the transmissive original, i.e., the film, can be illuminated with a sufficient light quantity even at the infrared wavelength characteristic. The arrangement also permits obtaining image information at a good S/N ratio, even at the infrared wavelength characteristic, by compensating for the low sensitivity of the sensor such as a CCD or the like for the infrared wavelength region. Even in the event of a transmissive or transparent original having dust or the like thereon, therefore, the dust or the like can be accurately detected and the adverse effect of the dust or the like can be adequately corrected. The arrangement of the invention thus gives an image output which is not deteriorated by the presence of dust or the like.

Further, reflection means which reflects a predetermined wavelength component is provided for combining a plurality of light fluxes coming respectively from different light emission sources. The reflection means is arranged, for example, to cut off an infrared light component in illuminating the transparent original with visible light by controlling the blinking of the light emission means which emits infrared light. This arrangement obviates the necessity of having an infrared-light cut filter attached by vapor deposition to the optical system for illuminating a transparent original (at the time of main scanning) like in the case of the conventional arrangement. The system or apparatus thus can be simply arranged to permit reduction in cost.

Accordingly, a sufficient light quantity can be obtained both in visible-light and infrared-light wavelength regions and the light sources can be stably controlled in reading image information from a transparent or transmissive original. Therefore, even in a case where dust or the like exists on the original, the dust or the like can be accurately detected and correction can be adequately carried out to obtain image information with a high image quality from the original.

What is claimed is:

1. An image reading apparatus, comprising:
    a first light emission unit for emitting light of first and second wavelength regions for illuminating an original;
    a second light emission unit for emitting light of said second wavelength region for illuminating the original;
    an image pickup unit for picking up the image recorded on the original;
    an optical element for leading light from said first light emission unit and light from said second light emission unit to the original, said optical element being arranged to reflect light of one of the first and second wavelength regions and to allow light of the other one of the first and second wavelength regions to pass therethrough;
    an optical filter member removably provided with respect to an optical path formed between said optical element and said image pickup unit, said optical filter member allowing only light of said second wavelength region to pass therethrough, and
    a control unit for controlling light emission of the first and second light emission units and for controlling movement of the optical filter, said control unit bringing about a first state in which only light of said first wavelength region is led to the original and a second state in which only light of said second wavelength region is led to the original
    wherein said control unit puts said optical filter on the optical path, turns on light emission of said first light emission unit and turns on light emission of said second light emission unit in said first state, and
    wherein said control unit removes said optical filter from the optical path, turns on light emission of said first light emission unit and turns off light emission of said second light emission unit.

2. An image reading apparatus according to claim 1, further comprising a scanning unit for causing the original and the image pickup unit to move and perform scanning relative to each other, wherein said control unit switches between the first and second states every time the scanning is performed by the scanning unit.

3. An image reading apparatus according to claim 1, wherein said first wavelength region is an infrared-light wavelength region, and said second wavelength region is a visible-light wavelength region.

4. An image reading apparatus according to claim 1, wherein said original is a light-transmissive original.

5. An image reading method for an image reading apparatus including: a first light emission unit for emitting light of first and second wavelength regions for illuminating an original;

a second light emission unit for emitting light of said second wavelength region for illuminating the original;

an optical element for reflecting light of one of said first and second wavelength regions and allowing light of the other one of said first and second wavelength regions to pass therethrough so as to lead the light to the original;

an image pickup unit for picking up the image recorded on the original;

an optical filter member movably provided with respect to an optical path formed between said optical element and said image pickup unit, said optical filter member allowing only light of said second wavelength to pass therethrough, and a control unit for controlling light emission of said first and second light emission units and for controlling movement of the optical filter, said method comprising the steps of:

reading the image on the original by said image pickup unit in a first state in which only light of said first wavelength region is led to the original;

reading the image on the original by said image pickup unit in a second state in which only light of said second wavelength region is led to the original;

wherein, in said first state, said optical filter is put on the optical path, light emission of said first light emission unit is turned on and light emission of said second light emission unit is turned on, and wherein, in said second state, said optical filter is removed from the optical path, light emission of said first light emission unit is turned on and light emission of said second light emission unit is turned off.

6. An image reading method according to claim 5, further comprising the steps of:

causing the original and the image pickup unit to move and perform scanning relative to each other, and switching between the first state in which only light of said first wavelength region is led to the original and the second state in which only light of said second wavelength region is led to the original.

7. An image reading method according to claim 5, wherein said first wavelength region is an infrared-light wavelength region, and said second wavelength region is a visible-light wavelength region.

8. An image reading method according to claim 5, wherein said original is a light-transmissive original.

* * * * *